(12) United States Patent
Rasmussen et al.

(10) Patent No.: US 10,383,395 B2
(45) Date of Patent: Aug. 20, 2019

(54) FORCE MITIGATING ATHLETIC SHOE

(71) Applicants: Jeffrey Mark Rasmussen, Catonsville, MD (US); Jack Stearns Rasmussen, Catonsville, MD (US); Guy D. Davis, Catonsville, MD (US)

(72) Inventors: Jeffrey Mark Rasmussen, Catonsville, MD (US); Jack Stearns Rasmussen, Catonsville, MD (US); Guy D. Davis, Catonsville, MD (US)

( * ) Notice: Subject to any disclaimer, the term of this patent is extended or adjusted under 35 U.S.C. 154(b) by 314 days.

(21) Appl. No.: 15/145,774

(22) Filed: May 3, 2016

(65) Prior Publication Data

US 2017/0318903 A1  Nov. 9, 2017
US 2018/0343970 A9  Dec. 6, 2018

Related U.S. Application Data

(60) Provisional application No. 62/156,276, filed on May 3, 2015.

(51) Int. Cl.
| | |
|---|---|
| *A43B 5/00* | (2006.01) |
| *A43B 13/02* | (2006.01) |
| *A43B 13/04* | (2006.01) |
| *A43B 13/12* | (2006.01) |
| *A43B 13/14* | (2006.01) |
| *A43B 13/18* | (2006.01) |
| *A43B 13/42* | (2006.01) |

(52) U.S. Cl.
CPC .............. *A43B 13/187* (2013.01); *A43B 5/00* (2013.01); *A43B 13/023* (2013.01); *A43B 13/026* (2013.01); *A43B 13/04* (2013.01); *A43B 13/12* (2013.01); *A43B 13/141* (2013.01); *A43B 13/181* (2013.01); *A43B 13/188* (2013.01); *A43B 13/42* (2013.01)

(58) Field of Classification Search
CPC ..... A43B 13/187; A43B 13/14; A43B 13/146; A43B 13/18; A43B 13/181; A43B 13/188; A43B 13/12; A43B 13/023; A43B 13/026; A43B 13/42
See application file for complete search history.

(56) References Cited

U.S. PATENT DOCUMENTS 4,439,934 A * 4/1984 Brown ...................... A43B 7/28
                                                       12/146 M
4,688,338 A * 8/1987 Brown ................... A43B 17/14
                                                       12/146 M
(Continued)

*Primary Examiner* — Kristen Matter
(74) *Attorney, Agent, or Firm* — Paul A. Bell

(57) ABSTRACT

In every athletic event, each athlete generates and subjects their lower extremities to forces that are unique to that athlete's mass, speed and strength. These forces are also affected by the composition of the playing field surface, shoe design and construction and other factors. It is possible to determine, according to these factors, the level of force above which injury to the athlete's lower extremities is inevitable. This level of force is called the pre-injury force threshold. This pre-injury force threshold is then used to design and create an athletic shoe which will provide a force-mitigating deformation induced by forces equal to the particular athlete's pre-injury force threshold. This deformation of the athletic shoe prevents injury to the athlete's lower extremities.

10 Claims, 17 Drawing Sheets

(56) References Cited

U.S. PATENT DOCUMENTS

| | | | | |
|---|---|---|---|---|
| 5,867,923 A * | 2/1999 | Lehneis | ............... | A43B 7/00 36/103 |
| 6,641,893 B1 * | 11/2003 | Suresh | ............... | C03C 14/00 428/105 |
| 7,254,905 B2 * | 8/2007 | Dennison | ............. | A43B 7/18 36/15 |
| 7,464,490 B2 * | 12/2008 | Lebo | ................. | A43B 13/026 36/102 |
| 9,565,897 B2 * | 2/2017 | Auger | ............... | A43B 7/1445 |
| 9,730,486 B2 * | 8/2017 | Brown | ............... | A43B 13/18 |
| 2004/0086735 A1 * | 5/2004 | Monsheimer | ......... | A43B 13/10 428/493 |
| 2007/0227039 A1 * | 10/2007 | Chaney | .............. | A43B 5/08 36/15 |
| 2014/0331517 A1 * | 11/2014 | Seo | .................. | A43B 7/1405 36/28 |
| 2016/0192741 A1 * | 7/2016 | Mark | ................ | A43B 17/003 36/43 |

\* cited by examiner

FORCE MITIGATING ATHLETIC SHOE

CROSS-REFERENCE TO RELATED APPLICATIONS

This application claims the benefit of and incorporates by reference U.S. patent application 62/156,276 filed on 3 May 2015.

STATEMENT REGARDING FEDERALLY SPONSORED RESEARCH OR DEVELOPMENT

Not Applicable

SEQUENCE LISTING

Not Applicable

BACKGROUND OF THE INVENTION

Each year in North America there are approximately 250,000 ACL injuries—about 70% of which are non-contact incidents. [Griffin LY. Noncontact Anterior Cruciate Ligament Injuries: Risk Factors and Prevention Strategies. [Journal of the American Academy of Orthopaedic Surgeons: 2000; 8:141-150] A near universally accepted and scientifically supported explanation for this non-contact statistic is the rotational and translational forces created when a player makes a sudden change in direction or stops. Exacerbating this natural force generation is athletic-shoe/playing-surface interfacetraction. Decades of private and academic studies prove a causal relationship between the increased desire for traction at the athletic-shoe/playing-surface interface and injurious forces that traction puts on the ACL. At some point, the human body is naturally unable to compensate for this force. Boden, Griffin and Garrett posit in their 2000 paper titled "Etiology and Prevention of Noncontact ACL Injury" the hormonal, anatomic and neuromuscular factors that may predispose athletes to ACL injuries. Regardless, athletic shoe manufacturers continue to produce shoes with ever more traction. Today, those shoes are being used on artificial turf, which is also designed to provide maximum traction.

Clearly, the conditions exist for even higher incidences of non-contact ACL injuries that sideline athletes of every age, gender and skill level. Yet few attempts at preventing non-contact ACL injuries have involved a viable athletic-shoe solution. Results have yielded shoe designs with unstable vertical profiles that compromise athletic performance and increase injury risk. U.S. Pat. No. 3,668,792 A (York) Jan. 8, 1971, entitled Breakaway Athletic Safety Shoe describes a breakaway system that, under duress, separates a spring-biased lower sole of the shoe from the upper section of the sole. U.S. Pat. No. 7,254,905-B2 (Dennison) Aug. 14, 2007, entitled Releasable Athletic Shoe Sole details a fully detachable lower sole with a mechanism designed to release when a pre-determined and specifically longitudinally directed force is applied. Published US Application 2013/0318832 A1 (Brown, et al) Dec. 5, 2013, entitled Self-Recovering Impact Absorbing Footwear, proposes an athletic shoe design which will allow the wearer of the shoe uninterrupted usage while dampening forces that surpass an injury threshold using a system of internal beams of various heights coupled with an internal air valve system. In spite of these, the incidence of non-contact ACL injuries continues to rise—painful proof that a practical solution has yet to be realized.

SUMMARY OF THE INVENTION

As they progress through an athletic event, every athlete generates and subjects their lower extremities to various forces that are unique to his or her mass, speed, and strength. This force is also affected by the composition of the playing field surface, by shoe sole design and construction, as well as by other factors. By determining, according to these and other factors, the level of force at which injury is inevitable (pre-injury force), an athletic shoe sole can be created to provide a mitigating deformation induced by a particular athlete's pre-determined, pre-injury force threshold. A mitigating deformation of as little as 2 degrees can reduce by threefold injurious forces such as torque (Groeger, Lena, "Injury Risks for the Female Athlete—Part 1"). After the athlete has progressed through that particular force-generating movement, the shoe's sole instantly returns to its original shape.

The present invention involves three embodiments of an athletic shoe designed to provide a mitigating deformation induced by a particular athlete's pre-determined, target, pre-injury force threshold and a method of preventing injury to an athlete's lower extremity joints. As different athletes, according to mass, speed, strength, playing surface conditions, etc. generate a wide range of forces, a wide range of force thresholds must be contemplated. Each embodiment of the invention permits an athletic shoe sole to be designed and constructed to permit a mitigating deformation induced by a particular athlete's pre-determined, target, pre-injury force threshold. This construction method allows a fine-tuning of the force threshold, allowing an individual athlete to have a shoe built to protect him or her from injurious forces.

The first embodiment is a shoe whose sole comprises multiple thin layers of specifically engineered composite materials. Each of the sole's layers comprises a filler material with embedded fibers in various anisotropic orientations. The assembled layers provide both translational (heel to toe) as well as lateral (side to side) and rotational (twisting) rigidity and strength, similar in performance to a traditional athletic shoe's thermoplastic elastomer or carbon fiber sole. Because an anisotropic composition provides strength and rigidity against forces perpendicular to the fibers, the inventive sole can be constructed to provide rigidity and strength only up to a pre-determined, target, pre-injury force threshold. When an athlete's pre-determined, target pre-injury force threshold is reached, the sole deforms, mitigating the stress. After the athlete has progressed through that particular force-generating movement, the shoe's sole instantly returns to its original shape.

The second embodiment is a shoe whose sole has a series of cut-outs comprising channels [or voids] cut into the sole material. The sole is designed to provide both translational (heel to toe) as well as lateral (side to side) and rotational (twisting) rigidity and strength, similar in performance to a traditional athletic shoe's thermoplastic elastomer or carbon fiber sole. However, because of the width, depth, area, location and orientation of the channels, the sole can be constructed to provide rigidity and strength only up to a pre-determined, target pre-injury force threshold. When an athlete's pre-determined, target pre-injury force threshold is reached, the sole deforms, mitigating the stress. As with the first embodiment, after the athlete has progressed through the particular force-generating movement, the shoe's sole instantly returns to its original shape.

The third embodiment is a shoe whose sole has a series of cut-outs comprising geometric shapes which are then filled with an elastomeric material similar to the material of the remainder of the sole, but with differing force-resisting properties than the rest of the sole. The sole of the third embodiment also provides both translational (heel to toe) as well as lateral (side to side) and rotational (twisting) rigidity and strength, similar in performance to a traditional athletic shoe's thermoplastic elastomer or carbon fiber sole. Because of the geometry, size, location and orientation of the filled in cut-outs in the sole, and because of the force-resisting properties of the filler material, the sole is constructed to provide rigidity and strength only up to a pre-determined, target pre-injury force threshold. When an athlete's pre-determined, pre-injury force threshold is reached, the sole deforms, mitigating the stress. As with the first and second embodiments, after the athlete has progressed through the particular force-generating movement, the shoe's sole instantly returns to its original shape.

The invention also involves a method of preventing injury to an athlete's lower extremity joints comprising the step of determining for a specific athlete in a specific playing field situation a series of target, pre-injury force thresholds. With these force thresholds determined, an athletic shoe is constructed with a sole which is designed to temporarily deform when the shoe sole is subjected to the pre-determined target pre-injury force threshold and to then return to its original form when the force applied to the shoe sole falls below the pre-determined target pre-injury force threshold.

As different athletes, according to mass, speed, strength, playing surface conditions, etc. generate a wide range of force, a wide range of force thresholds must be contemplated. By constructing the sole of the shoe of the first embodiment with multiple thin layers, each with a unique and specific anisotropic fiber orientation, those layers can be combined into hundreds of different combinations. This construction method allows a fine-tuning of the force threshold, allowing an individual athlete to have a shoe built to protect him or her from injurious forces.

In the shoe of the first embodiment, the rigidity and strength of a particular layer will depend on the number, orientation, composition and individual strength of the fibers embedded within that layer. Several layers will have fiber orientation specifically related to providing rigidity and strength, as well as force-mitigating deformation against translational force (forward, heel to toe). Other of the layers, while adding to overall forward-force characteristics, will be oriented to provide rigidity and strength, as well as force-mitigating deformation against rotational force (torque). Still other of the layers, while adding to overall forward-force and torque characteristics, will be oriented to provide rigidity and strength, as well as force-mitigating deformation against lateral (side to side) force. Each layer will be evaluated in the context of it being combined with other layers to create the desired athlete-specific force-mitigating deformation.

In the shoe of the second embodiment, the rigidity and strength of the shoe sole will depend on the width, depth, area, location and orientation of the channels, the sole can thus be constructed to provide rigidity and strength only up to the pre-determined, target pre-injury force threshold.

In the shoe of the third embodiment, the rigidity and strength of the shoe sole will depend on the geometry, size, location and orientation of the filled in cut-outs in the sole, and the force-resisting properties of the filler material. The sole can thus be constructed to provide rigidity and strength only up to the pre-determined, target pre-injury force threshold. It is noted that this filler material may be a material similar to the fibrous material used to construct the sole of the first embodiment shoe.

The fibers bound into the sole materials may include, but are not limited to, carbon, silicon carbide, graphene, glass, nylon, metallic, aramid fibers, and various other natural and/or synthetic materials. The matrix binding and protecting the fibers may include, but will not be limited to, various polymers, natural and/or synthetic rubbers, thermoplastics, polyvinyl chloride, polyethylene, polypropylene, styrene butadiene, isobutylene, isoprene butadiene, and the like. The materials comprising the filler material of the third embodiment sole may be the same materials described above in regard to the matrix binding and protecting the fibers. The filler material may or may not include the bound fibers described above.

For all embodiments of the invention, construction of the shoe sole is contemplated as a 3-D printed process, with printed layers forming a collective printed sole originating with different materials, chemistries, optional reinforcing and arrayed fibers, etc. to allow for full, athlete-specific customization of the properties of the structure of the sole. For the all embodiments sole materials will comprise various layers with specific elasticity, flexural and tensile strength characteristics spanning a wide overall range of said characteristics. For the third embodiment, sole materials will be similar to those of the first two embodiments and the filler material, as noted above, will be similar to the sole materials but may or may not include bound fibers.

The invention involves three embodiments of an athletic shoe whose composition and construction will provide rigid lateral stability and strength during normal athletic movement. However, at a pre-determined, athlete-specific, target pre-injury force threshold the sole temporarily deforms to prevent injury to the athlete's lower extremity joints. The invention is intended to encompass cleated and/or nubbed field shoes as well as tennis, handball, volleyball, basketball and other athletic footwear. The primary joint of concern is the knee's ACL.

The invention also comprises a method of preventing injury to an athlete's lower extremity joints. The method comprises determining for a specific athlete in a specific playing environment a unique target pre-injury force threshold. Given this target pre-injury force threshold, a customized athletic shoe having a composite sole comprising multiple thin layers of specifically engineered composite materials is built for a specific athlete in a specific playing environment. Shorten, et al surmised that the '... interaction (between shoe and playing surface) suggests that appropriate shoe selection for a given surface is an important element in risk reduction.' (Shorten, Hudson, and Himmelsbach, "Shoe-Surface Traction of Conventional and In-Filled Synthetic Turf Football Surfaces"). The composite sole of the shoe will provide the athlete sufficient traction and stability in the specific playing environment but will temporarily deform when the shoe is subjected to the target pre-injury force threshold, thus preventing injurious force from being applied to the athlete's lower extremity joints.

Given the current state of the art in shoe construction, it is possible to calculate the target force threshold and construct a unique and athlete-specific athletic shoe for a given playing environment and other factors using modern 3D printing technology. It is possible, for example, to provide a customized athletic shoe for a particular athlete in a specific playing environment (natural grass vs. synthetic turf, wet vs. dry, etc., etc.), or even for the first part of an athletic event and then to provide another customized athletic shoe for the athlete to wear during another portion of the same athletic event. As an example, a customized athletic shoe could be built for an athlete for a football or soccer game on a particular day with a specific playing environment as described supra. If the specific playing environment changes during the athletic event, for example, due to rain or snow or playing field deterioration which could affect the target force threshold, another shoe could available or could be built in time for the athlete to wear the new shoe in the second half [or later portions] of the game.

This method will also accommodate changes in the athlete's physical situation, which often occur during an athletic event. For example, an injury to the athlete's leg or foot may mandate a different target force threshold; in that instance, a new shoe can be constructed to immediately accommodate this changed physical situation. Muscle fatigue, for example, could warrant constructing another shoe for the second half of the athletic event. Orchard and Powell concluded by analyzing 5,910 NFL games that not only field composition affected injury rates, but also cold weather vs. hot weather, wet vs. dry conditions, and even early season vs. later season condition of athletes as well as playing surfaces. The factors that lowered shoe/playing surface traction (and resulting force) also reduced injury risk (Orchard, J. W., Powell, J. W., "Risk of Knee and Ankle Sprains Under Various Weather Conditions in the National Football League," 1993, July). By using pre-constructed portions of the athletic shoe specific to a given athlete and/or venue, it may even be possible to make new shoes, as necessary, for each quarter of a football game.

Use of 3-D printing construction method allows fine-tuning of the composite sole to construct a sole that can prevent the generation of injurious force to an athlete's lower extremities.

DETAILED DESCRIPTION

The athletic shoe 10 according to a first embodiment of the invention is shown in FIGS. 1-8. The athletic shoe soles shown in FIGS. 1-8 are designed to protect an athlete's lower extremities against both injurious torsional [torque] forces and injurious longitudinal forces.

Figure 1:
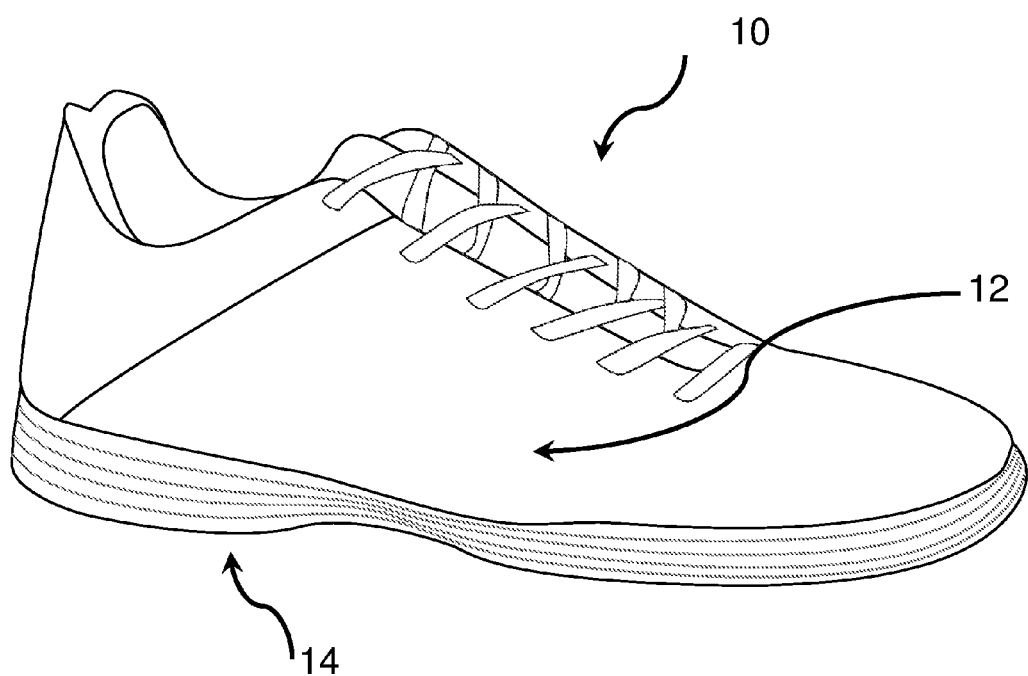
FIG. 1 is a perspective view of the composite athletic shoe according to a first embodiment of the invention.
Figure 2:
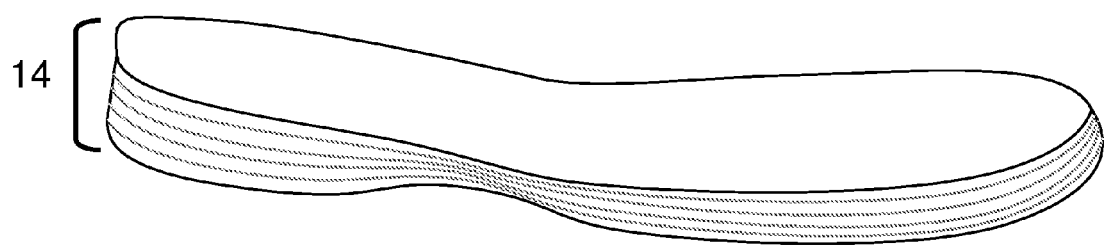
FIG. 2 is a view of the sole of the athletic shoe of FIG. 1.
Figure 3:
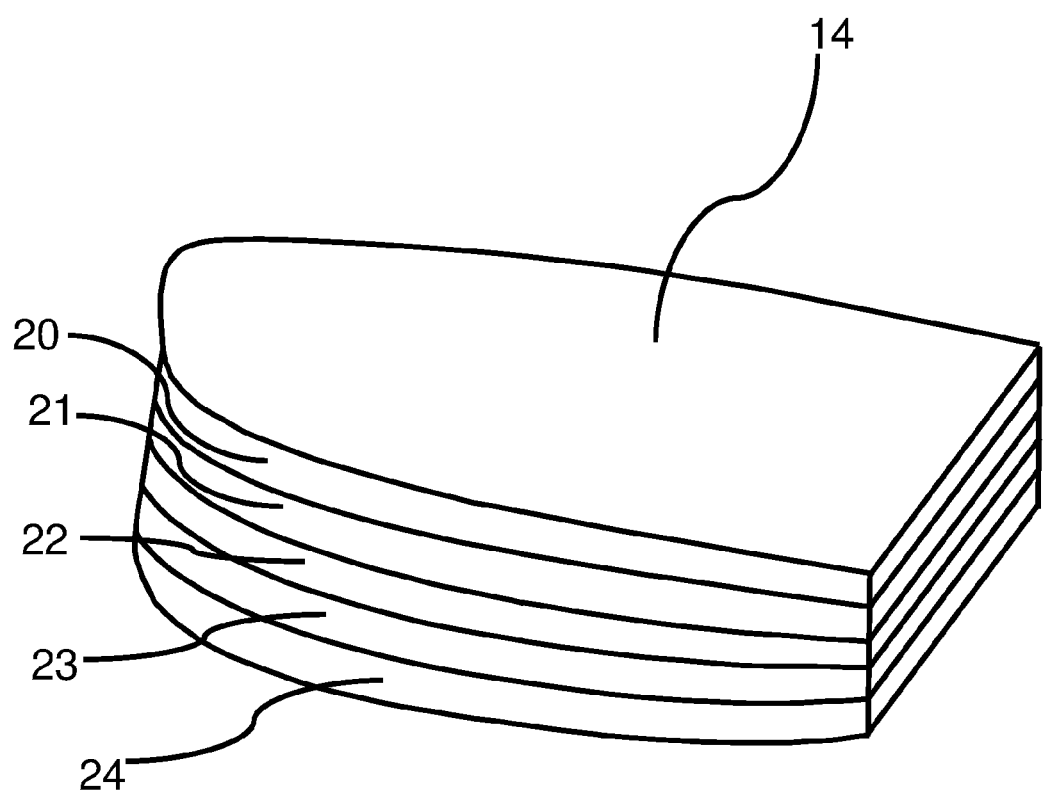
FIG. 3 is a blown-up view of a portion of the shoe sole of FIG. 2.

The shoe sole shown in FIGS. 1-8 comprises an upper body 12 and a multi-layer composite sole 14. Multi-layer composite sole 14 is shown in FIGS. 2-8 as comprising 5 thin layers of materials, although the exact number of layers could be more or less than 5 depending upon the specific situation the shoe is designed for. As shown in FIG. 3, sole 14 comprises layers 20, 21, 22, 23 and 24. Layers 20, and 24 are designed to provide rigid translational (straight ahead) stability during competition, like a traditional athletic shoe, only up to a pre-determined, athlete-specific, pre-injury target force threshold. These layers will also contribute limited rigidity during lateral as well as rotational (twisting) force generation. Layers 21 and 23 also will contribute to overall translational rigidity, as well as rotational stability only up to a pre-determined, athlete-specific, pre-injury force threshold (the target, pre-injury force threshold). The athlete-specific/target-force-specific anisotropic fiber orientation in the sole's layers will allow the sole to temporarily deform in response to, and to dissipate, the specific target force that would otherwise cause injurious stress to that particular athlete's lower extremities.

Figure 4:
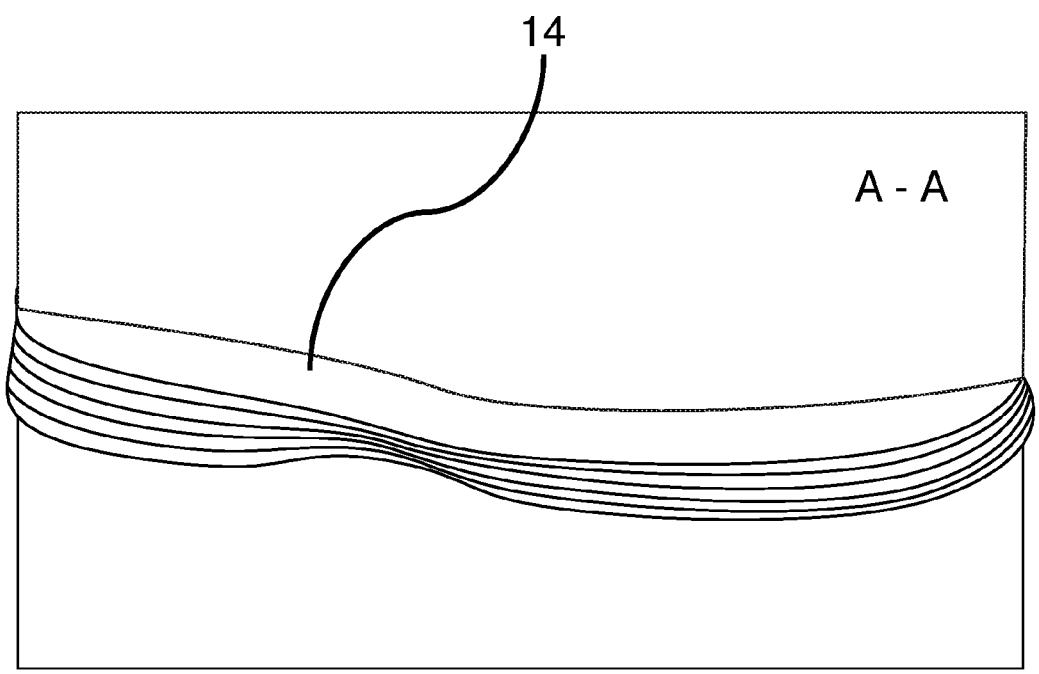
FIG. 4 is another view of the sole of FIG. 2 showing the cutting plane A-A that determines the perspective of FIG. 5.
Figure 5:
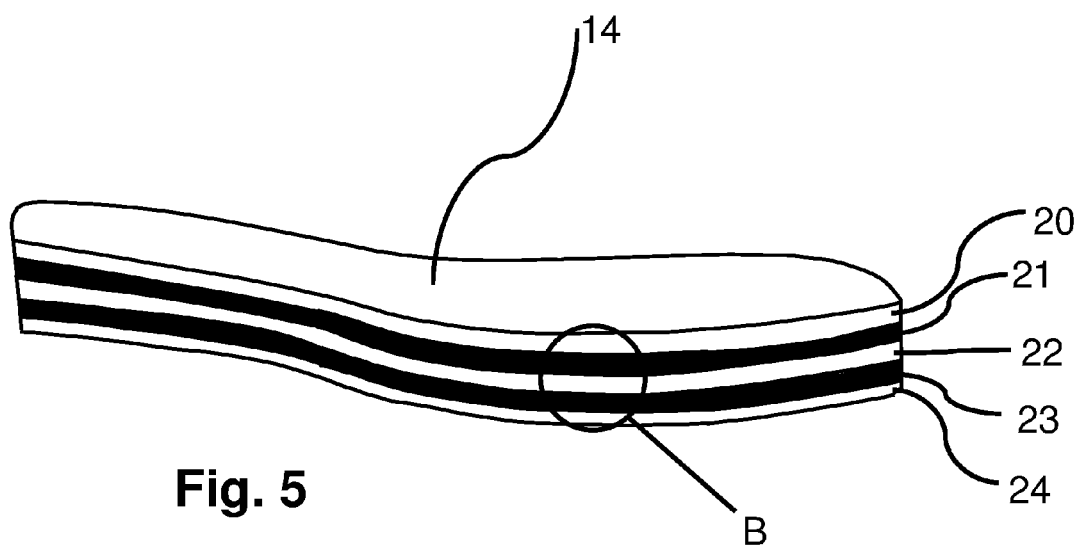
FIG. 5 shows a section of the sole of FIG. 2 now under a rotational stress and taken along the plane A-A as shown in FIG. 4.
Figure 6:
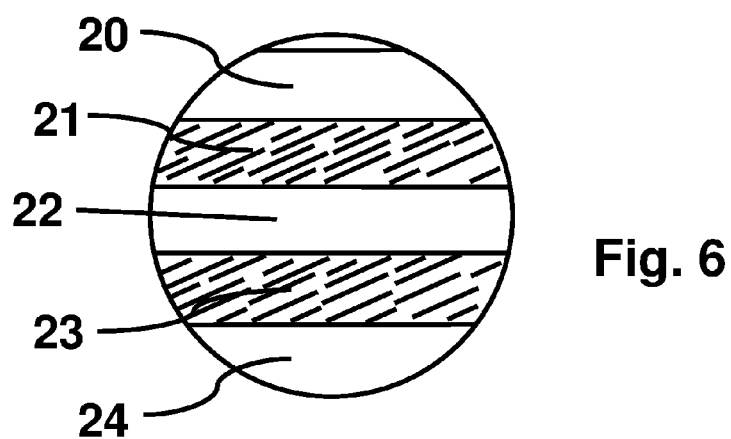
FIG. 6 is an enlarged view of the section of FIG. 5 inside the circle B.

Sole 14 is shown in FIG. 4 in its unstressed condition. As shown in FIGS. 5 and 6, sole 14 has been subjected to a rotational force equivalent to the pre-determined, target, pre-injury force threshold at which point layers 21 and 23 have temporarily deformed about the shoe's rotational axis to alleviate and prevent the application of injurious force to the athlete's lower extremities.

As shown in FIG. 6, the anisotropic fibers in layers 21 and 23 have caused the layers to temporarily deform under the application of the pre-determined target pre-injury force threshold. When the event that generated the target force threshold has passed, the layers immediately return to their unstressed condition.

Figure 7:
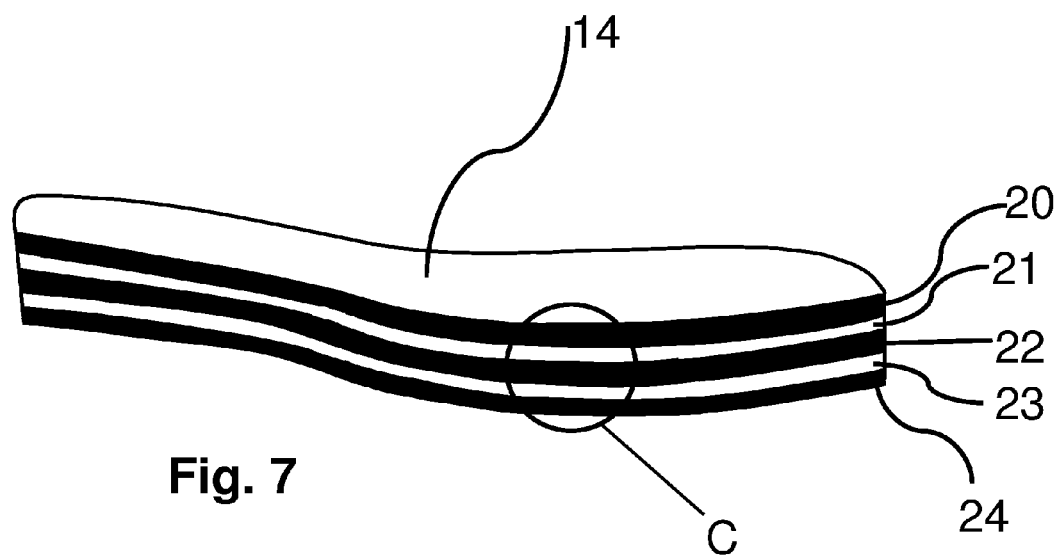
FIG. 7 shows a section of the sole of FIG. 2 also taken along the plane A-A as shown in FIG. 4. The sole is now being subjected to longitudinal stress.
Figure 8:
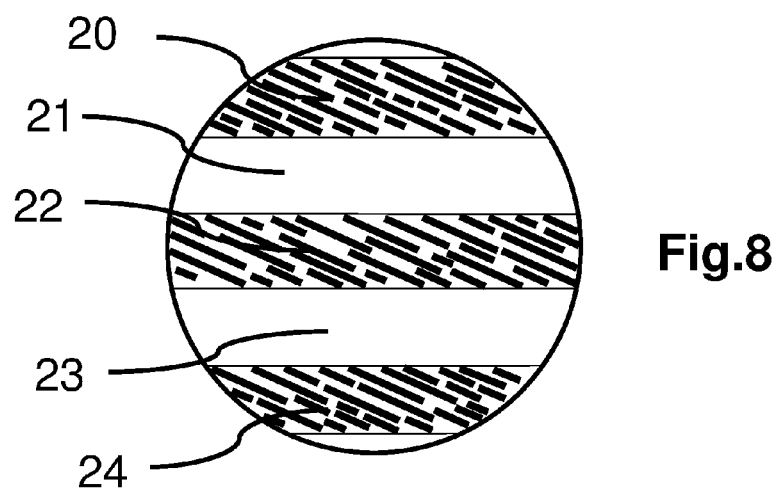
FIG. 8 is an enlarged view of the section of FIG. 7 inside the circle C.

Sole 14 is also shown in FIGS. 7 and 8. Sole 14 is shown as having 5 layers of material, although—as noted above—the exact number of layers could be more or less than 5 depending upon the specific situation the shoe is designed for. As shown in FIGS. 7 and 8, sole 14 comprises layers 20, 21, 22, 23, and 24 as in FIGS. 5 and 6. Layers 20, 22 and 24 are designed to provide rigid translational (straight ahead) stability during competition, like a traditional athletic shoe, only up to a pre-determined, athlete-specific, pre-injury target force threshold (the target, pre-injury force threshold). These layers will also contribute limited rigidity during lateral and rotational (twisting) force generation. Layers 21 and 23 also will contribute to overall translational rigidity, as well as lateral and rotational strength and stability only up to a pre-determined, athlete-specific, pre-injury force threshold (the target, pre-injury, force threshold). The athlete-specific/target-force-specific anisotropic fiber orientation in the sole's layers will allow the sole to temporarily deform in response to, and to dissipate, the specific target force that might otherwise cause injurious force to that particular athlete's lower extremities.

FIGS. 7 and 8 illustrate the sole being subjected to a longitudinal (heel to toe) force equivalent to the pre-determined target, pre-injury force threshold. The layers 20, 22 and 24 have temporarily deformed in the longitudinal direction to alleviate and prevent the application of injurious longitudinal force to the athlete's lower extremities. As shown in FIG. 8, the anisotropic fibers in layers 20, 22 and 24 have caused the layers to temporarily deform in the longitudinal direction under the application of the target, pre-injury force threshold. When the event that generated the target, pre-injury force threshold has passed, the layers immediately return to their unstressed condition.

Figure 9:
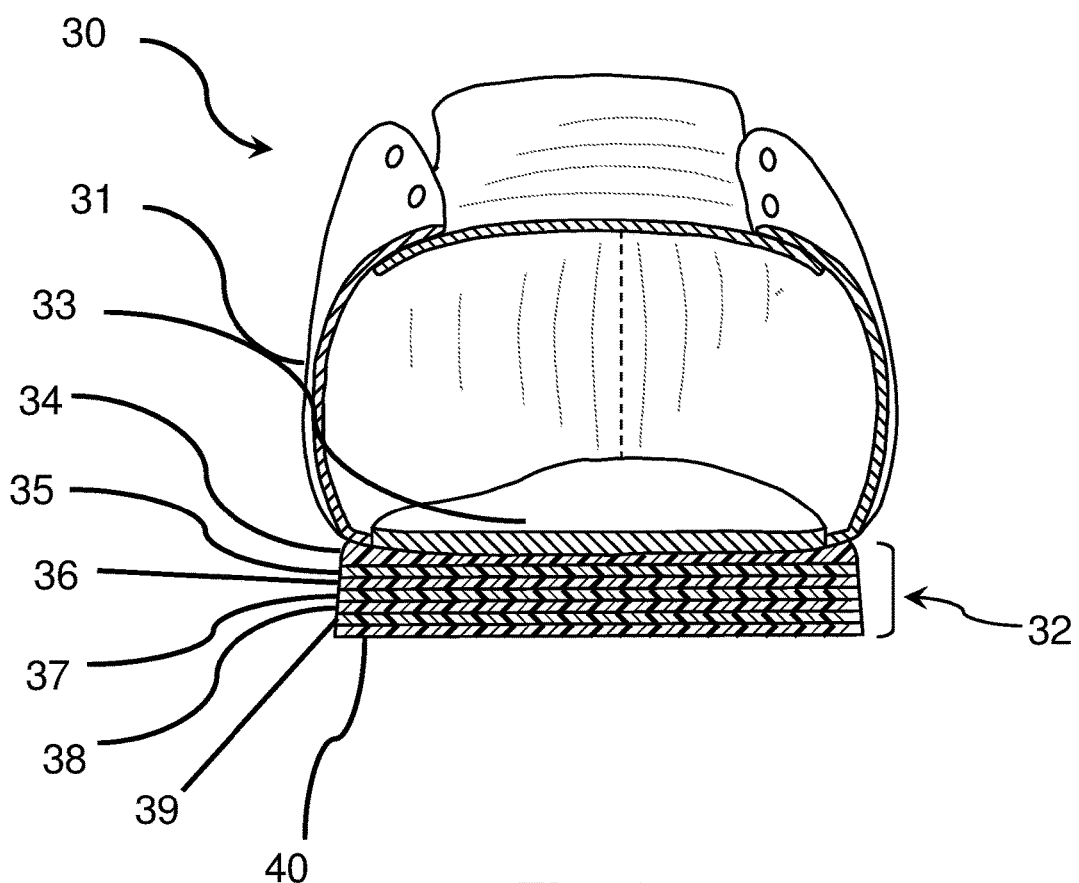
FIG. 9 is a cross-section of an athletic shoe according to the first embodiment of this invention but with more individual layers in the sole.

FIG. 9 illustrates a variation of the first embodiment of the athletic shoe with a seven-layer sole. Shoe 30 comprises upper 31 and multi-layered sole 32. Shoe 30 also has a sock liner 33. Sole 32 comprises layers 34, 35, 36, 37, 38, 39, and 40. Certain of these layers can be designed to deform upon application of a longitudinal target, pre-injury force threshold. Certain of the other layers can be designed to deform upon application of a lateral target, pre-injury force threshold and of a rotational target, pre-injury force threshold.

Figure 10:
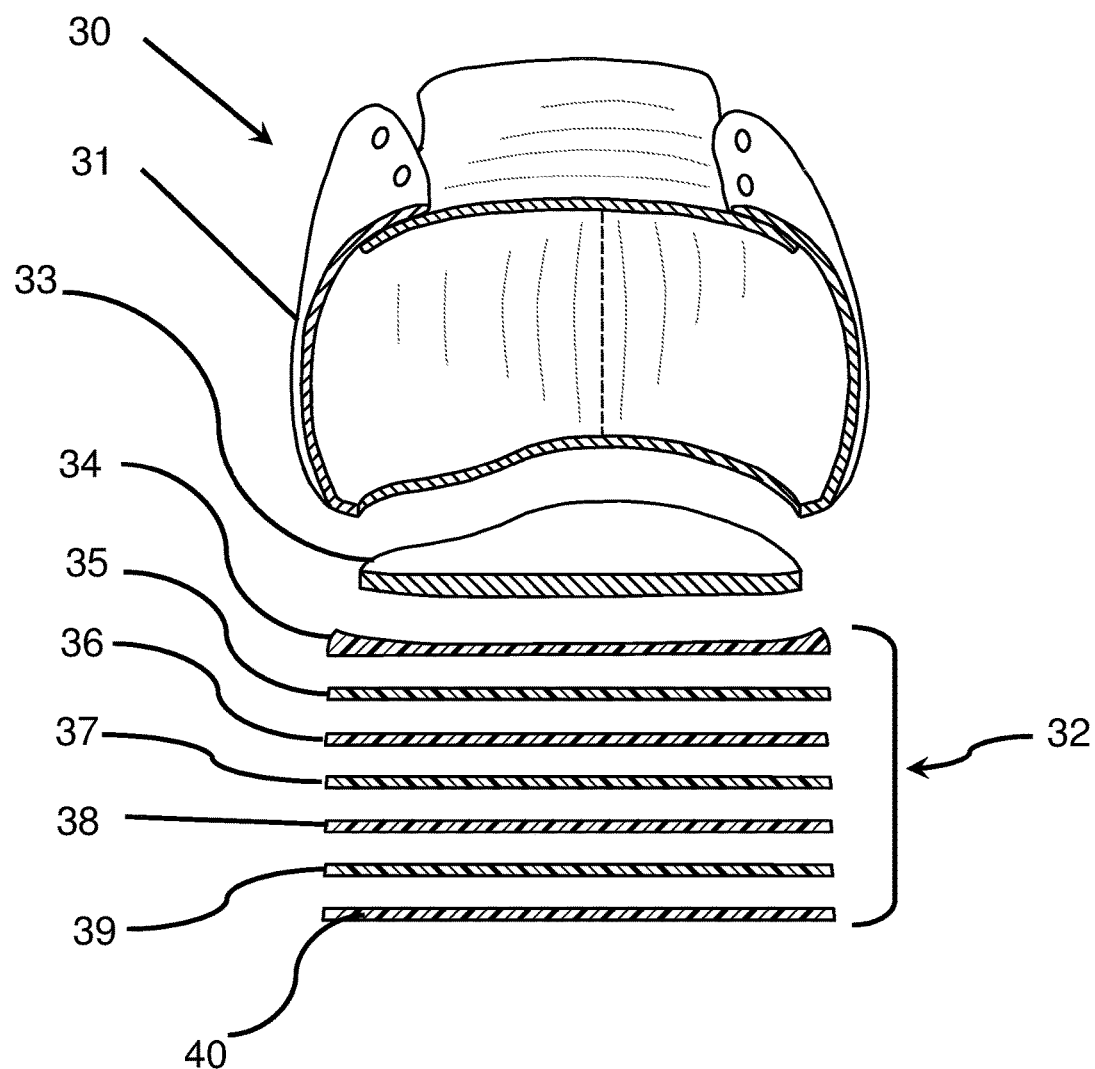
FIG. 10 is an exploded view of the shoe shown in FIG. 9.

Shoe 30 is shown in an exploded view in FIG. 10. In this embodiment layers 35 and 37 are the layers that temporarily deform upon application of the longitudinal target, pre-injury force threshold. Layers 36 and 38 will temporarily deform upon application of the rotational target, pre-injury force threshold and layers 34 and 39 will temporarily deform upon application of the lateral (side-to-side) target, pre-injury force threshold.

It is noted that in the above example in FIG. 10 there is no particular significance as to which layers temporarily deform to mitigate which type of target, pre-injury force threshold. Obviously, any of the layers could be selected to mitigate any particular type of target, pre-injury force threshold. Nor is there any particular significance in this example as to how many individual layers will temporarily deform to mitigate a particular target, pre-injury force threshold. In this example, two layers were used to mitigate each of the three types of target-pre-injury force thresholds, but more layers or fewer could also have been used, depending upon the exact circumstances of the particular athlete-specific factors and the particular environmental factors. With this embodiment, the athlete's lower extremities can be protected against injurious longitudinal, rotational and lateral (side-to-side) forces.

Figure 11:
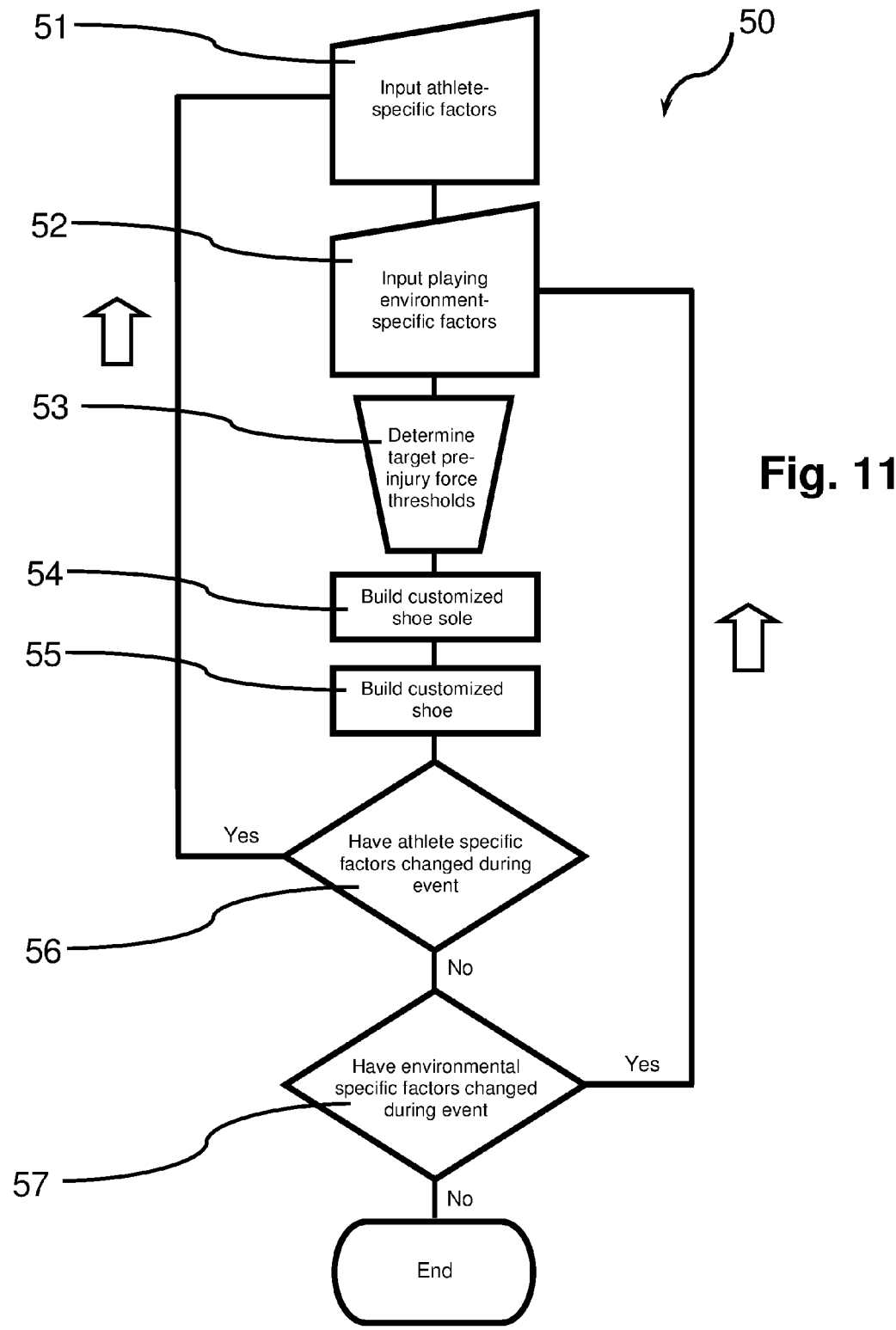
FIG. 11 is a flow chart illustrating a method of the invention.

The method 50 of the invention is illustrated in FIG. 11. The method comprises determining for a particular athlete, in a specific playing environment, the athlete-specific factors contributing to the longitudinal, rotational and lateral (side-to-side) target, pre-injury force thresholds. These factors are then inputted at 51. Next, the environment-specific factors contributing to the longitudinal, rotational and lateral (side-to-side) target, pre-injury force thresholds are determined. These factors are inputted at 52 and the longitudinal, rotational and lateral (side-to-side) target, pre-injury force thresholds are determined at 53. This information is then used to build an athletic shoe sole customized for the particular athlete in the specific playing environment at 54. A customized athletic shoe is then built at 55 using the customized sole built at 54. The athlete then uses the customized shoe in a playing event. At certain, pre-determined times during the playing event, the athlete-specific factors are re-evaluated at 56. Also at these pre-determined times, the environmental-specific factors are re-evaluated at 57. The changes to these factors are evaluated at 57 and if they have been significantly changed, new longitudinal, rotational and lateral (side-to-side) target, pre-injury force thresholds are determined and a new customized sole and shoe are built for use by the athlete for the remainder of the event. Using modern 3-D printing technology, it is possible to build several customized shoes for the athlete during the course of an event.

Figure 12:
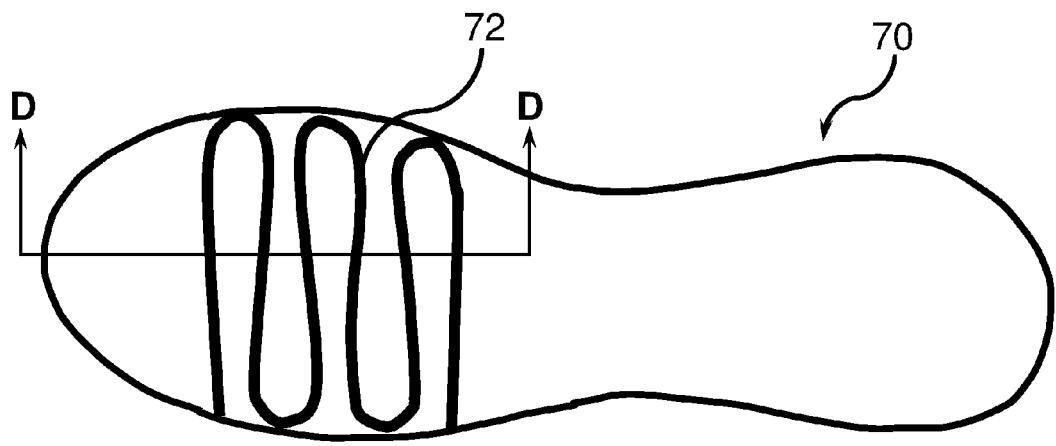
FIG. 12 is a plan view of the sole of a second embodiment of the invention.
Figure 13:
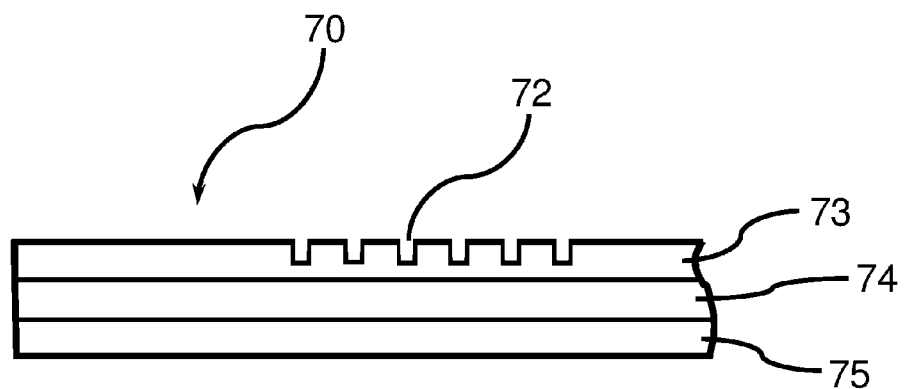
FIG. 13 is a view taken along the plane D-D of the sole shown in FIG. 12.
Figure 14:
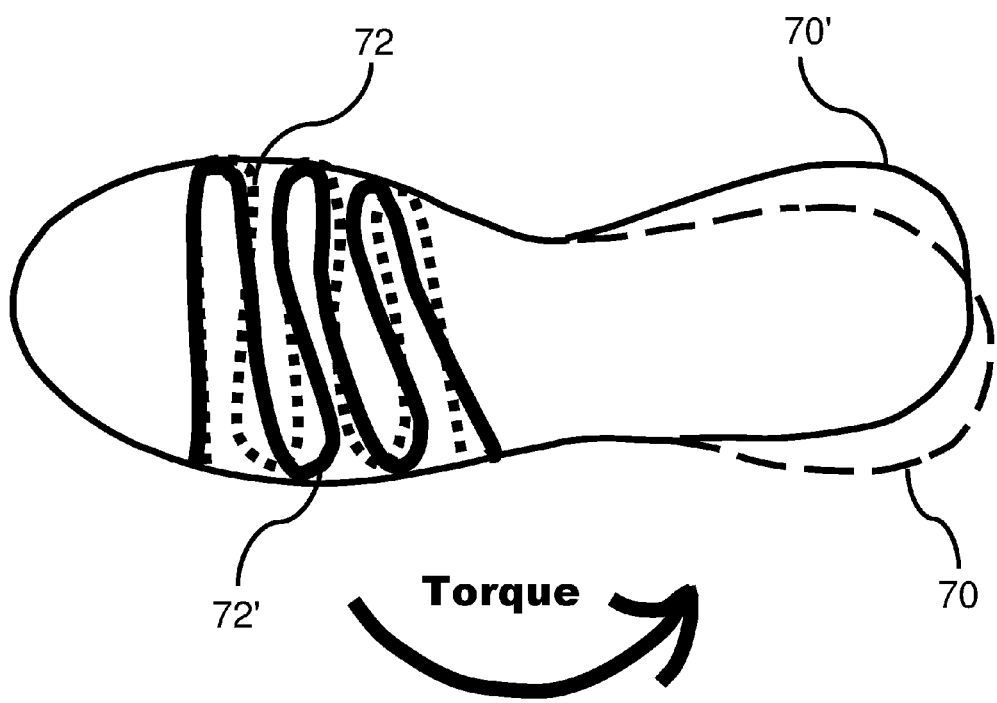
FIG. 14 is a plan view of the sole shown in FIG. 12 deforming under the effects of an external torsion [torque] force.

FIGS. 12-14 show an athletic shoe sole constructed according to the second embodiment of the invention. The three figures will be described together with it being understood that elements shown in one figure may or may not be shown in the other figures.

Sole 70 is a multi-layer composite sole similar in construction to the first embodiment soles shown and described above. Multi-layer composite sole 70 is shown as comprising composite layers 73, 74, and 75, although the exact number of layers could be more or less, as desired. Sole 70 comprises materials similar to those of the first embodiment. Multi-layer sole 70 has a cut-out or channel 72 incised into the outer surface of layer 73. Channel 72 is shown in the figures as being incised into the forward portion of sole 70. It should be understood that the exact placement of channel 72 can and will vary depending upon the desired force-resisting characteristics of sole 70 just as the width, depth and exact pathway of channel 72 can and will be varied depending upon the desired force-resisting characteristics of sole 70. It is noted that even though channel 72 is only shown in the figures as being incised into an outer layer of the sole, it could also be incised into an internal layer, if desired.

Channel 72 follows a somewhat serpentine pathway and is designed to strategically weaken sole 70 such that sole 70 will temporarily deform in response to, and to dissipate, the specific target force that might otherwise cause injurious force to that particular athlete's lower extremities. Layers 73, 74, and 75 will also provide limited rigidity during lateral and rotational (twisting) force generation. Layers 73, 74, and 75 also will contribute to overall translational rigidity, as well as lateral and rotational strength and stability. The width, depth and exact pathway of channel 72 can be varied to provide the exact response desired to provide a mitigating deformation induced by a particular athlete's pre-determined, pre-injury force threshold.

FIG. 14 shows Sole 70 deforming under stress from an externally applied torque. The rear end of sole 70 has twisted upwardly in response to the stress and the portion of sole 70 containing channel 72 has distorted in response to the stress.

The twisted portion of sole 70 is shown at 70' and the untwisted portion is shown [by a dashed line] at 70. The undistorted channel 72 is shown as a dotted line while the distorted channel is shown as a solid line at 72'.

Figure 15:
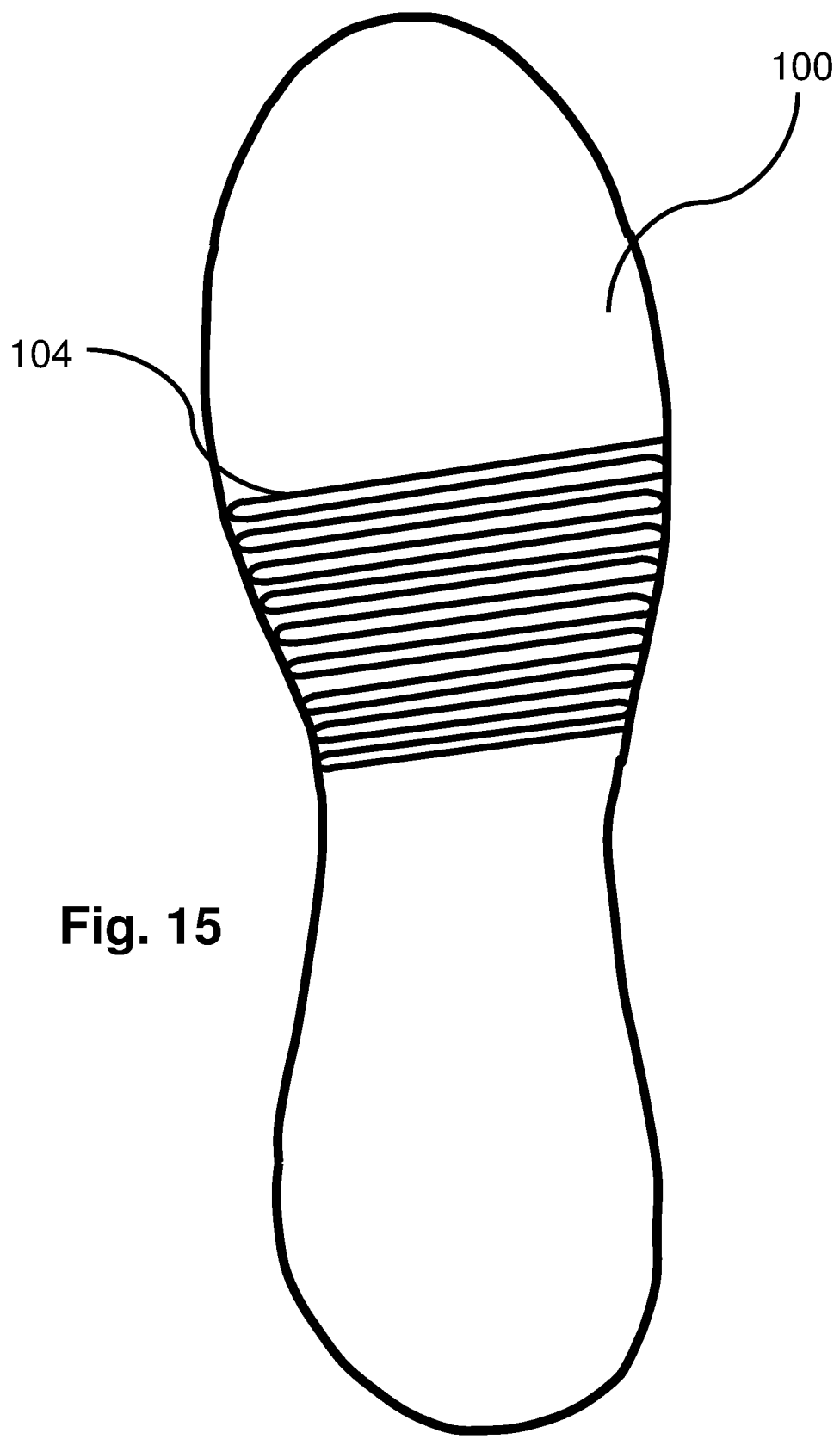
FIG. 15 is a plan view of another version a sole constructed according to the second embodiment of the invention.

FIG. 15 shows a variation of the second embodiment of the invention with a channel 104 incised into the outer surface of sole 100. Channel 104 is somewhat shallower than channel 72 shown in FIGS. 12-14 and extends for a much greater length with more undulations than channel 72. As in the soles show above, the exact width, depth and pathway of channel 104 can be varied to provide the exact response desired to provide a mitigating deformation induced by a particular athlete's pre-determined, pre-injury force threshold.

Figure 16:
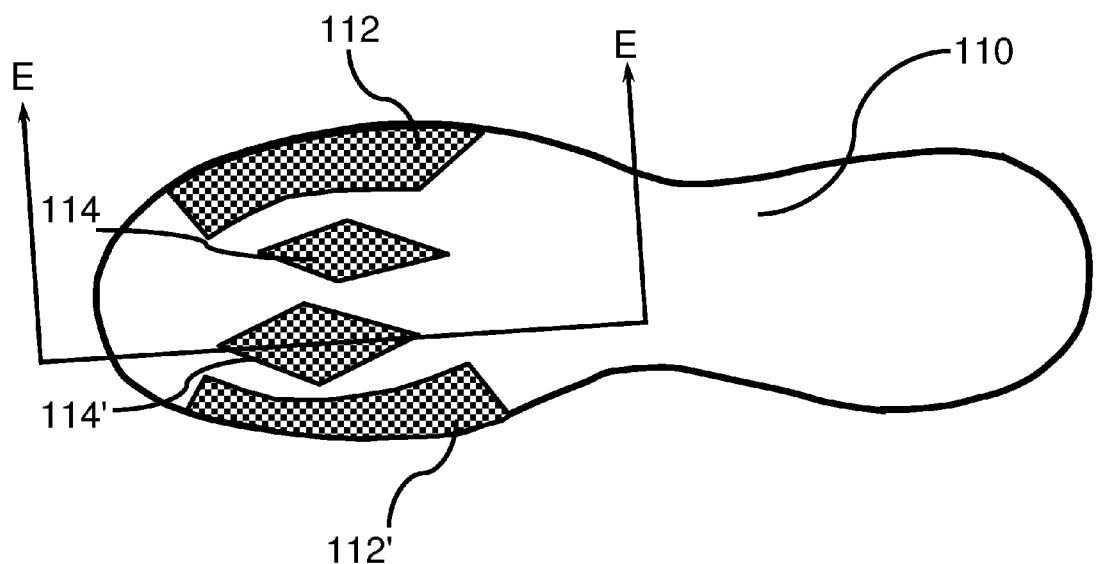
FIG. 16 is a plan view of a first variation of a sole constructed according to the third embodiment of the invention.
Figure 17:
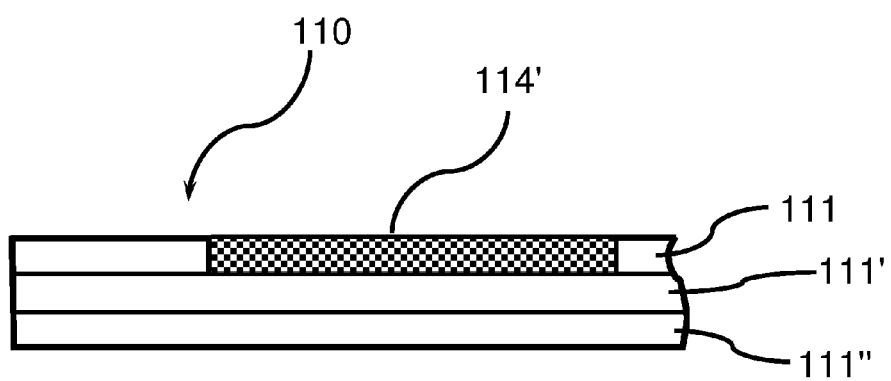
FIG. 17 is a view taken along the plane E-E of the sole shown in FIG. 16.

FIGS. 16-23 show a third embodiment of the invention. In this embodiment the sole is strategically weakened to provide the desired temporary deformation via inserts in the sole rather than by incising a channel in the sole. FIGS. 16 and 17 will be described together with it being understood that elements shown in one figure may or may not be shown in the other figure. It is noted that the inserts are all shown in the forward [toe] portion of the sole. Obviously, one or more inserts could be positioned in the mid portion of the sole, or even in the heel portion of the sole, if desired.

Sole 110 is a multi-layer composite sole similar in construction to the first and second embodiment soles shown and described above. The forward portion of sole 110 contains 4 inserts, 112, 112', 114 and 114'. These inserts are made of a composite filler material similar to the sole materials described above; however, the filler material may or may not include bound fibers. The filler material of the inserts will have force-resisting characteristics that are different [and perhaps substantially so] than the materials comprising remaining portions of sole 110. These differences in material properties assist in providing the desired weakening in sole 110 to permit it to provide a mitigating deformation induced by a particular athlete's pre-determined, pre-injury force threshold. In addition, the exact location of the inserts within the sole, the number of inserts, their geometric shape, and their depth are all characteristics which can be varied in order to provide the exact response desired to provide a mitigating deformation of sole 110 induced by a particular athlete's pre-determined, pre-injury force threshold.

Sole 110 is a multi-layer composite sole comprising layers 111, 111' and 111". As with the other embodiments of the invention, the number and composition of layers in sole 110 can and will vary depending upon the exact force-resisting response desired. In FIG. 17, insert 114' is shown as being the same thickness as layer 111. Obviously, the thickness of the inserts can also be varied as desired. Inserts 112, 112', 114 and 114' are shown as being contained within the outer layer of sole 110; however, they could be placed in other layers of sole 110, if desired.

Figure 18:
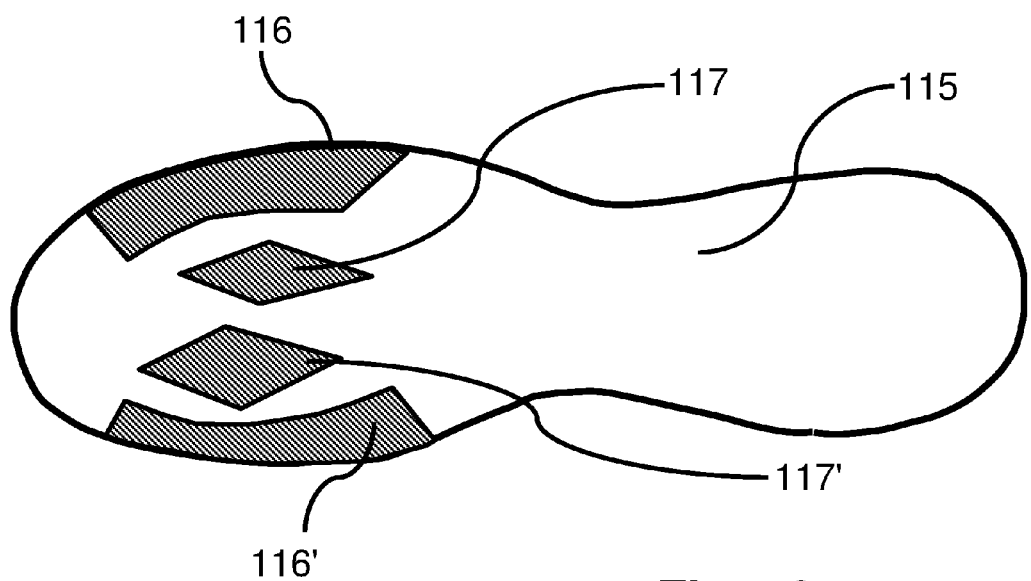
FIG. 18 is a plan view of a second variation of a sole constructed according to the third embodiment of the invention.

FIG. 18 shows a variation of the third embodiment of the invention. Multi-layer composite sole 115 is shown with four inserts 116, 116', 117 and 117'. These inserts comprise a material with significantly different force-resisting characteristics than the material comprising inserts 112, 112', 114 and 114'. As an example, a shoe with the inventive sole may be designed for a specific athlete for a specific event. During the event, which could be a football game, a soccer game or perhaps a rugby match, the weather changes substantially and the playing field becomes much slicker due to heavy rain. Following the method shown and described above, a new shoe using sole 115 could be constructed for the specific athlete [for instance, during the halftime break]. Since conditions are much slicker on the playing field, a shoe with sole 110 having inserts 112, 112', 114 and 114' might be too stiff for the changed playing conditions and a new shoe would be constructed with sole 115 having inserts 116, 116', 117 and 117' made of a material significantly less stiff than the material comprising inserts 112, 112', 114 and 114'.

Figure 19:
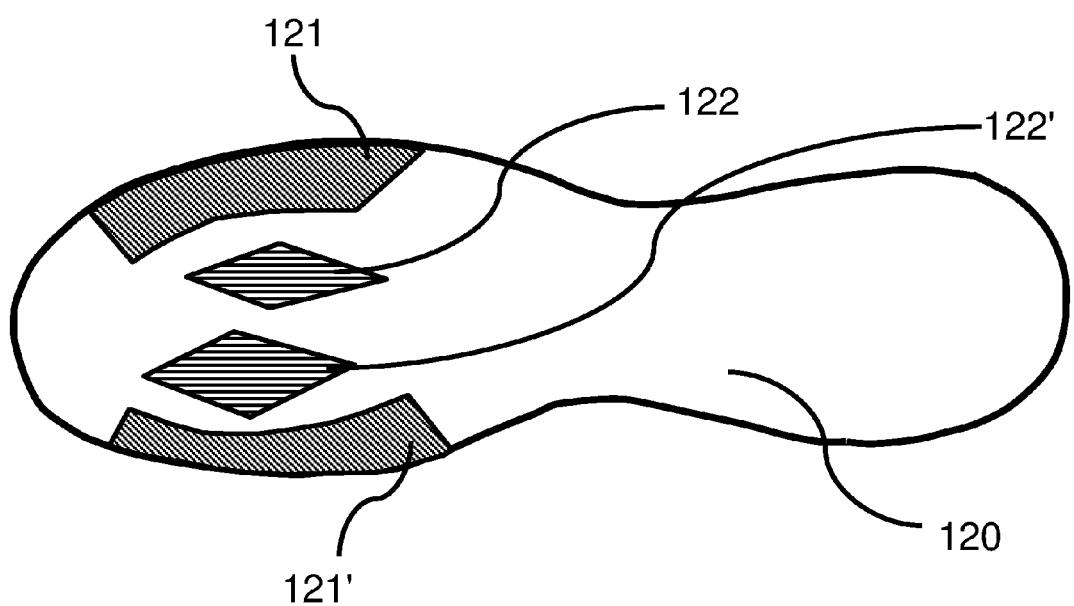
FIG. 19 is a plan view of third variation of a sole constructed according to the third embodiment of the invention.

FIG. 19 shows another variation of the third embodiment of the invention. Multi-layer composite sole 120 is shown with four inserts 121, 121', 122 and 122'. The previous examples of the third embodiment have had inserts all made from the same filler material. It is possible to provide in one sole inserts made from different filler materials. This is illustrated in FIG. 19. Inserts 121 and 121' are made from a material similar to that used for inserts 116, 116', 117 and 117' of sole 115 shown in FIG. 18. Inserts 122 and 122' are made from a material that has different force-resisting characteristics than the material used for the inserts for sole 115. This variation permits fine-tuning of the force-resisting characteristics of sole 115.

Figure 20:
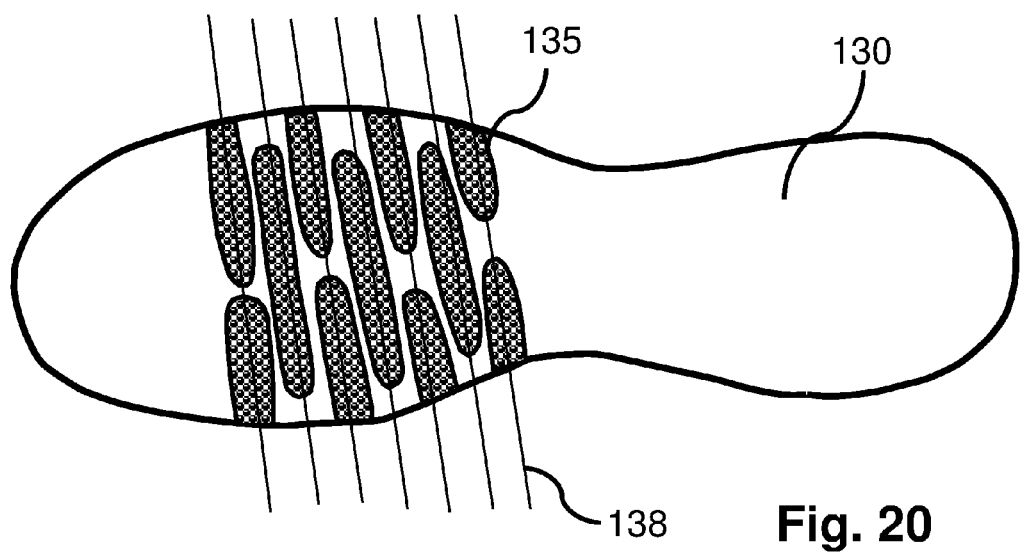
FIG. 20 is a plan view of a fourth variation of a sole constructed according to the third embodiment of the invention.
Figure 21:
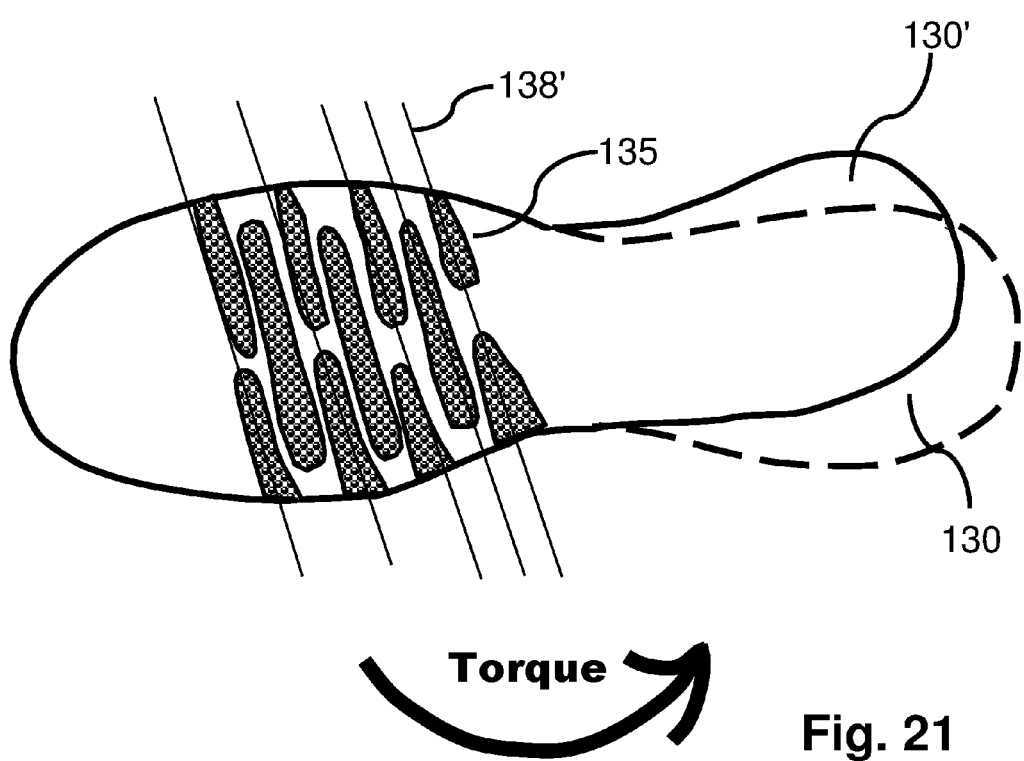
FIG. 21 is a plan view of the sole shown in FIG. 20 deforming under the effects of an external torsion [torque] force.

FIGS. 20-23 show yet another variation of the third embodiment of the invention. In previous variants of the third embodiment, the inserts have been oriented in a generally longitudinal [heel to toe] direction within the sole. In this embodiment, inserts 135 are oriented generally transverse to the sole 130. This is illustrated in FIG. 20 by lines 138. In FIG. 21 sole 130 is shown being stressed and deformed by a torsional force [torque]. The original position of the rear portion of sole 130' is shown by a dashed line. The deformed position is shown at 130 by a solid line. Inserts 135 have changed shape in response to the torsional force as shown in FIG. 21 and have also assumed a different orientation as shown by lines 138'. As in previous versions of this embodiment, the size, orientation, geometric shape, placement within the sole outline, and composition of the insert filler material are all factors that will assist in determining the force-mitigating properties of the particular sole. Also as indicated above, it is possible to have some or all of the inserts 135 be in a layer within the shoe sole and not on an outer layer.

Figure 22:
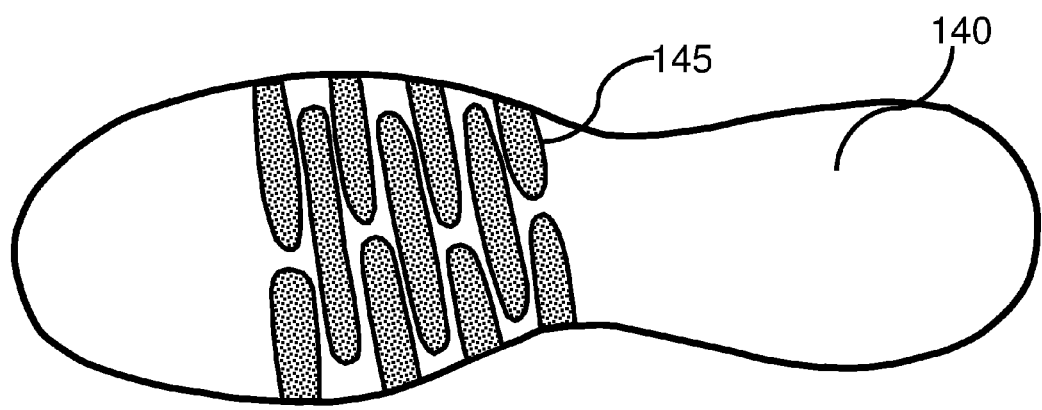
FIG. 22 is a plan view of a fifth variation of a sole constructed according to the third embodiment of the invention.
Figure 23:
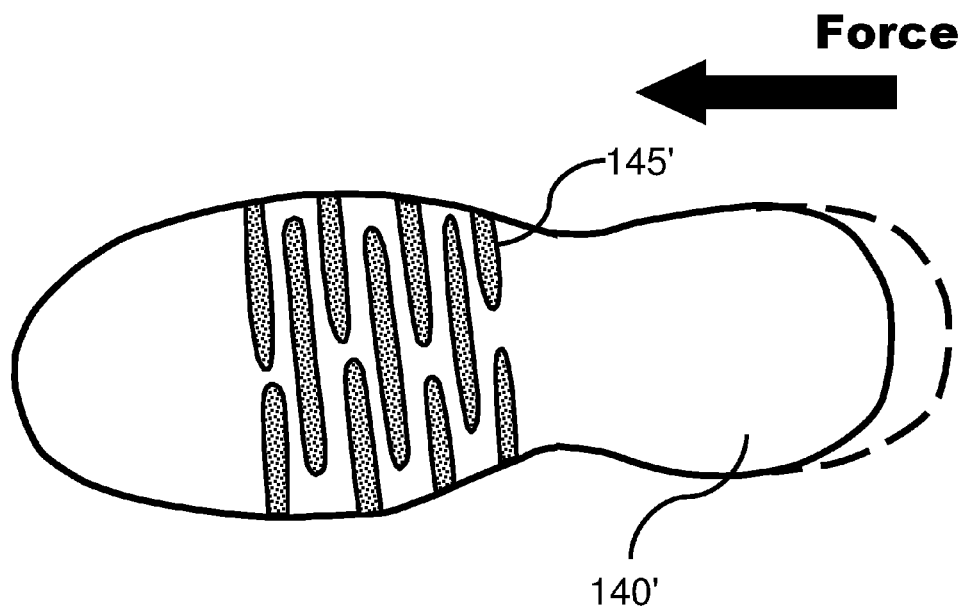
FIG. 23 is a plan view of the sole shown in FIG. 22 deforming under the effects of an external longitudinal force.

FIGS. 22 and 23 show a shoe sole similar to that shown in FIGS. 20 and 21; however, this sole is being stressed by a longitudinal [heel to toe] force. Sole 140 has multiple inserts 145 shown on the outer layer of the sole. As shown in FIG. 23, when sole 140 is subjected to a longitudinal force, inserts 145 temporarily deform to essentially "shorten" the shoe and in doing so provide a force-mitigating deformation of the particular shoe to prevent injury to the athlete's lower extremities and joints. The Dennison reference cited above is concerned with providing protection from just such an injurious longitudinal force.

Each embodiment of the invention provides protection from injurious force to an athlete's lower extremity joints by providing a temporary force-mitigating deformation in the athlete's specifically configured shoe. Unlike other attempts to correct this problem, applicants have provided a shoe with a sole that is designed to temporarily deform when the sole is subjected to the pre-determined target pre-injury force threshold and to then return to its original form when the force applied to the shoe sole falls below the pre-determined target pre-injury force threshold.

The invention claimed is:

1. A force-mitigating shoe designed to protect a wearer's lower extremity joints from injurious stress caused by an applied force equivalent to a pre-determined target, pre-injury force, said shoe comprising:

an upper body and a force-mitigating sole attached to said upper body;

wherein said pre-determined target, pre-injury force comprises at least a pre-determined longitudinal target, pre-injury force and a pre-determined rotational target, pre-injury force; and wherein said force-mitigating sole comprises:

at least first and second layers of specifically engineered material;

wherein said first layer is specifically engineered to provide rigid translational stability to a wearer's foot when said first layer is subjected to forces below the level of said pre-determined longitudinal target, pre-injury force;

wherein said first layer is specifically engineered to become less rigid and temporarily deform in the same direction as said pre-determined longitudinal target, pre-injury force when said first layer is subjected to a force equivalent to said pre-determined longitudinal target, pre-injury force;

wherein said second layer is specifically engineered to provide rigid rotational stability to the wearer's foot when said second layer is subjected to forces below the level of said pre-determined rotational target, pre-injury force;

wherein said second layer is specifically engineered to become less rigid and temporarily deform in the same direction as said pre-determined rotational target, pre-injury force when said second layer is subjected to a force equivalent to said pre-determined rotational target, pre-injury force.

2. The force-mitigating shoe of claim 1, wherein said first layer of specifically engineered material is specifically engineered such that after said first layer has deformed when subjected to an applied force equivalent to said pre-determined longitudinal target, pre-injury force and said applied force drops below the level of said pre-determined longitudinal target, pre-injury force, said first layer instantly returns to its original shape.

3. The force-mitigating shoe of claim 2, wherein said second layer of specifically engineered material is specifically engineered such that after said second layer has deformed when subjected to an applied force equivalent to said pre-determined rotational target, pre-injury force and said applied force drops below the level of said pre-determined rotational target, pre-injury force, said second layer instantly returns to its original shape.

4. The force-mitigating shoe of claim 1, wherein each of said first and second layers of specifically engineered material comprises an engineered composite material comprising a filler material with embedded fibers in various anisotropic orientations.

5. The force-mitigating shoe of claim 1, wherein said pre-determined target, pre-injury force further comprises a pre-determined lateral target, pre-injury force;

wherein said force-mitigating sole further comprises a third layer of specifically engineered material;

wherein said third layer is specifically engineered to provide rigid lateral stability to a wearer's foot when said third layer is subjected to forces below the level of said pre-determined lateral target, pre-injury force; and, wherein said third layer is specifically engineered to become less rigid and temporarily deform in the same direction as said pre-determined lateral target, pre-injury force when said third layer is subjected to a force equivalent to said pre-determined lateral target, pre-injury force.

6. The force-mitigating shoe of claim 1, wherein said at least first and second layers comprise at least four layers of an engineered composite material, said engineered composite material comprising a filler material with embedded fibers in various anisotropic orientations;

wherein at least two of said at least four layers are specifically engineered to provide rigid translational stability to the wearer's foot when said at least two of said at least four layers are subjected to applied forces below the level of said pre-determined longitudinal target, pre-injury force;

wherein said at least two of said at least four layers are specifically engineered to temporarily deform in the same direction as said pre-determined longitudinal target, pre-injury force when said at least two of said at least four layers are subjected to an applied force equivalent to said pre-determined longitudinal target, pre-injury force;

wherein at least two of the remaining layers of said force-mitigating sole are specifically engineered to provide rigid rotational stability to the wearer's foot when said at least two of said remaining layers are subjected to applied forces below the level of said pre-determined rotational target, pre-injury force;

wherein said at least two of the remaining layers are specifically engineered to temporarily deform in the same direction as said pre-determined rotational target, pre-injury force when said at least two of the remaining layers are subjected to an applied force equivalent to said pre-determined rotational target, pre-injury force.

7. The force-mitigating shoe of claim 6, wherein said at least two of said four layers are interleaved with said at least two of said remaining layers.

8. A method of preventing injury to an athlete's lower extremity joints comprising the steps of:

determining a longitudinal target, pre-injury force and a rotational target, pre-injury force for a specific athlete in a specific playing field situation; and constructing a customized athletic shoe comprising an upper body and a force-mitigating sole attached to the upper body, the force-mitigating sole comprising:

at least first and second layers of specifically engineered material;

wherein said first layer is specifically engineered to provide rigid translational stability to a wearer's foot when said first layer is subjected to forces below the level of said pre-determined longitudinal target, pre-injury force;

wherein said first layer is specifically engineered to become less rigid and temporarily deform in the same direction as said pre-determined longitudinal target, pre-injury force when said first layer is subjected to a force equivalent to said pre-determined longitudinal target, pre-injury force;

wherein said second layer is specifically engineered to provide rigid rotational stability to the wearer's foot when said second layer is subjected to forces below the level of said pre-determined rotational target, pre-injury force; and, wherein said second layer is specifically engineered to become less rigid and temporarily deform in the same direction as said pre-determined rotational target, pre-injury force when said second layer is subjected to a force equivalent to said pre-determined rotational target, pre-injury force.

9. A force-mitigating shoe designed to protect a wearer's lower extremity joints from injurious stress caused by an applied force equivalent to a pre-determined target, pre-injury force wherein said pre-determined target, pre-injury force comprises a pre-determined longitudinal target, pre-injury force, a pre-determined lateral target, pre-injury force and a pre-determined rotational target, pre-injury force, said shoe comprising:
an upper body; and
a force-mitigating sole attached to said upper body;
said force-mitigating sole comprising first, second, third, fourth, fifth and sixth layers of specifically engineered material;
said second and fourth layers of specifically engineered material providing rigid translational stability to a wearer's foot when said second and fourth layers are subjected to applied forces below the level of said pre-determined longitudinal target, pre-injury force;
said second and fourth layers of specifically engineered material being engineered to become less rigid and temporarily deform in the direction of said pre-determined longitudinal target, pre-injury force when said second and fourth layers are subjected to an applied force which is equivalent to said pre-determined longitudinal target, pre-injury force;
said third and fifth layers of specifically engineered material providing rigid rotational stability to the wearer's foot when said third and fifth layers are subjected to applied forces below the level of said pre-determined rotational target, pre-injury force;
said third and fifth layers of specifically engineered material being engineered to become less rigid and temporarily deform in the direction of said pre-determined rotational target, pre-injury force when said third and fifth layers are subjected to an applied force which is equivalent to said pre-determined rotational target, pre-injury force;
said first and sixth layers of specifically engineered material providing rigid lateral stability to a wearer's foot when said first and sixth layers are subjected to applied forces below the level of said pre-determined lateral target, pre-injury force;
said first and sixth layers of specifically engineered material being engineered to become less rigid and temporarily deform in the direction of said pre-determined lateral target, pre-injury force when the first and sixth layers are subjected to an applied force which is equivalent to said pre-determined lateral target, pre-injury force.

10. The force-mitigating shoe of claim 9, wherein the first, second, third, fourth, fifth and sixth layers of specifically engineered material each comprise an engineered composite material comprising a filler material with embedded fibers in various anisotropic orientations.

\* \* \* \* \*